Figure 1:
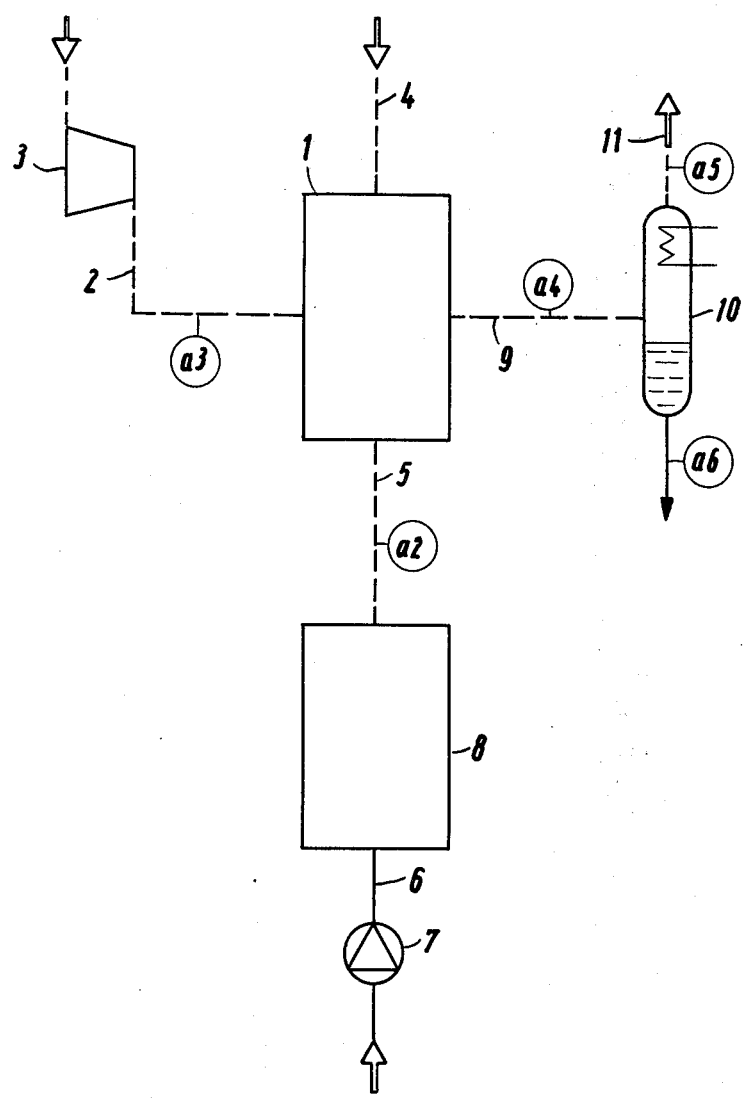

United States Patent [19]

Mandrin

[11] 4,426,370
[45] Jan. 17, 1984

[54] METHOD FOR THE PREPARATION OF DEUTERIUM-ENRICHED WATER IN THE PREPARATION OF HYDROGEN

[75] Inventor: Charles Mandrin, Winterthur, Switzerland

[73] Assignee: Sulzer Brothers Limited, Winterthur, Switzerland

[21] Appl. No.: 292,415

[22] Filed: Aug. 13, 1981

[30] Foreign Application Priority Data

Jan. 9, 1980 [CH] Switzerland ............... 6570/80

[51] Int. Cl.³ .................................................. C01B 5/00
[52] U.S. Cl. ............................. 423/580 H; 423/648 A
[58] Field of Search ........... 423/580 R, 580 H, 648 A

[56] References Cited

U.S. PATENT DOCUMENTS

| 4,123,508 | 10/1978 | Mandrin | 422/211 |
| 4,264,567 | 4/1981 | Pinto | 252/373 |

FOREIGN PATENT DOCUMENTS

| 2542705 | 3/1977 | Fed. Rep. of Germany ... 423/648 A |
| 2637811 | 4/1977 | Fed. Rep. of Germany ... 423/648 A |
| 55-51702 | 4/1980 | Japan ............................... 423/648 A |

*Primary Examiner*—O. R. Vertiz
*Assistant Examiner*—Wayne A. Langel
*Attorney, Agent, or Firm*—Kenyon & Kenyon

[57] ABSTRACT

The synthesis-gas plant is operated in a number of successive operating periods such that during the first operating period an excess of fresh water is supplied to the synthesis gas plant and the waste water from the resulting mixture is separated in a condenser and supplied to a storage container. During the subsequent operating periods, the waste water stored in the container is used as the feed water for the synthesis gas plant and the waste water obtained on each occasion is stored in the container with increasing deuterium concentration. The waste water obtained during the last operating period and having the highest deuterium concentration is used to feed a plant for producing heavy water.

This process, when used in a synthesis gas plant for producing hydrogen, can be used to obtain deuterium-enriched water as a feedstock for a heavy-water plant without expensive additional energy-consuming devices.

13 Claims, 5 Drawing Figures

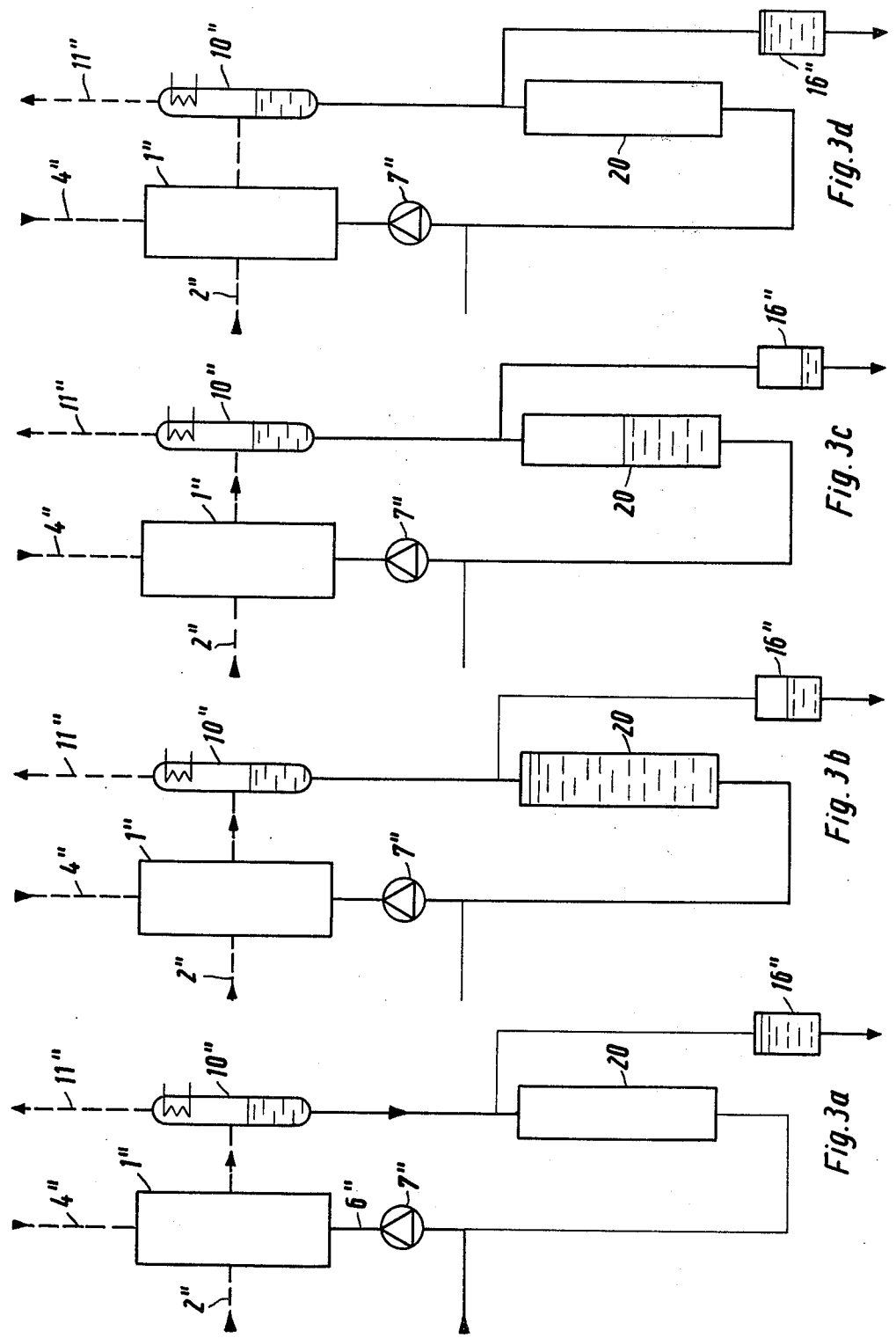

METHOD FOR THE PREPARATION OF DEUTERIUM-ENRICHED WATER IN THE PREPARATION OF HYDROGEN

This invention relates to a method for the preparation of deuterium-enriched water in the preparation of hydrogen.

Heretofore, various methods have been known for producing deuterium-enriched water. For example, as described in U.S. Pat. No. 4,123,508, a hydrogen-producing process which obtains hydrogen by catalytic and/or thermal separation can be used to obtain deuterium-enriched water.

Generally, in these hydrogen-producing processes, for example for making ammonia or methanol in a synthesis gas plant, considerable through-put quantities of hydrogen, water and steam are present. Thus, it is possible to obtain deuterium-enriched water as a by-product and to use the obtained water as a starting material or feedstock in a plant of conventional construction for the production of heavy water, for example, a plant as described in Canadian Pat. No. 963,364.

It is also known that the higher the deuterium concentration of the starting material is, the more economically efficient relative to the cost of energy and instrumentation is the plant for producing heavy water. Further, it is known that in the usual catalytic and/or thermal methods for producing hydrogen, deuterium enrichment of steam occurs at the expense of a deuterium depletion of hydrogen. Canadian Pat. No. 963,364, for instance, describes and illustrates a detail of one such conventional hydrogen preparation facility.

In this known process of obtaining a deuterium-enriched water, a mixture leaving the hydrogen production plant is separated into gaseous and liquid components. The resulting condensate, containing deuterium, is then isolated and returned into the charge of the production plant with the deuterium contained in the condensate being transferred by isotope exchange in counter-current to a partial stream of fresh steam, the partial stream of steam is then returned with the deuterium into the charge of the production plant. This process is carried out so that the hydrogen obtained in a thermal and catalytic plant leaves the plant with a natural deuterium concentration. Then, for the purpose of producing heavy water, deuterium is to be extracted in a manner known per se from the synthesis gas, which in in the given example is discharged from the plant before the synthesis gas is processed to ammonia in a synthesis plant.

If the known plant were modified so that instead of extracting deuterium from the synthesis gas, the condensed waste water leaving the hydrogen production plant were used as the starting material for a heavy water production plant, then the deuterium concentration would indeed be higher than the natural deuterium concentration of the hydrogen, but not higher than about 200 parts per million (ppm) $[D/(D+H)]$.

In the process known from U.S. Pat. No. 4,123,508, it is indeed possible to produce a starting material for the heavy water production plant which has a somewhat higher deuterium concentration, i.e., 333 ppm $[D/(D+H)]$ in the given example. This, however, can be achieved only if certain steps are performed. For example, the steam fed into the hydrogen production plant must be enriched beyond the natural deuterium concentration by bringing the steam into isotope exchange with a water stream enriched with deuterium composed of a first partial stream of water taken from a condenser connected after the hydrogen producer and a second partial stream originating from an additional water source and enriched with deuterium during the process (the deuterium concentration of which is between the natural deuterium concentration and that of the first partial stream). Further, the gas mixture of hydrogen, steam and residual components from the condenser must be introduced into at least one exchange stage in which, in a separation stage in the presence of a catalyst, the steam becomes enriched with deuterium, by isotope exchange between the hydrogen and the steam of the mixture. Still further, the water taken from the additional water source must be brought in contact with the mixture in an exchange column, the water becoming enriched with deuterium by isotope exchange with the steam. Also, the mixture stream, which after condensing of any steam remaining therein consists essentially of hydrogen, must be drawn out of the plant, and the deuterium-enriched water removed from the condenser connected after the hydrogen producer.

Such a plant, therefore, requires an additional synthesis gas-water exchange plant for achieving the desired deuterium enrichment of the starting material for the heavy water production plant.

Accordingly, it is an object of the invention to make possible a deuterium enrichment of the condensed waste water component serving as a starting material for a plant for the production of heavy water in a more economical manner, i.e. without requiring additional equipment.

It is another object of the invention to obtain an economical deuterium enrichment of a condensed waste water as a feedstock for a heavy water plant.

It is another object of the invention to provide a method of obtaining a highly deuterium-enriched water which can use relatively simple and inexpensive equipment.

Briefly, the invention provides a method for the preparation of deuterium-enriched water which can be carried out in an otherwise conventional apparatus for obtaining heavy water. In accordance with the invention, at least carbon or one or more hydrocarbons is supplied with water or steam in excess to a hydrogen production plant for obtaining synthesis gas during a first operating period. An effluent from the plant is then separated into a gaseous component consisting of a deuterium-enriched waste water during this operating period and the liquid component is then isolated. Next, the liquid component is introduced into the plant during a second operating period of shorter duration (rather than fresh water) and contacted with carbon or hydrocarbon(s). The resulting effluent during the second operating stage is then separated into a liquid component consisting of a deuterium-enriched waste water and a gaseous component. Next, this liquid component is supplied to a plant for the production of heavy water.

By using the waste water in successive operating periods in the production of deuterium-enriched water, the waste water condensed out of the mixture leaving the plant shows a continuously increasing higher deuterium concentration as compared with the water or steam fed into the plant.

The invention makes use of the fact that the known catalytic and/or thermal hydrogen preparation plants require water or steam (water vapor) to be supplied in excess for the reactions which occur because of chemical equilibrium conditions. The proportion of water supplied in excess to the amount of water discharged from the plant depends upon the kind of process used for hydrogen production and is particularly sensitive to the nature of the fuel supplied.

The invention is based on the knowledge that because that operating periods occur consecutively and during each, except for the first period, the enriched discharged water of the previous period is always used as the feed water for the hydrogen plant, the deuterium enrichment of the discharge water up to substantially any level can be achieved, as will be described in greater detail hereinafter.

At the end of the last operating period, the feedstock for the plant for preparing heavy water is a relatively small amount of water, but very highly enriched in deuterium.

The amount of the feedstock and the deuterium concentration thereof will depend on the throughputs, the number of operating periods and the length of the total operating time; the first operating period determines the duration of the subsequent, staggered operating periods.

However, the throughputs of all components involved in hydrogen preparation are equal during the operating periods, the only change being the progressive shortening of the operating periods up to the end of the operating time.

The process can be performed in a plant of known construction in which the only extra requirements are one or more storage containers and conveying means, such as pumps.

According to advantageous feature of the invention, a heavy-water plant can operate continuously even if, for operating reasons such as a current failure, the hydrogen plant temporarily shuts down during an operating period. To this end, the waste water which has separated out, for example by condensing, at the end of the last operating period is stored for a given time before introduction into the heavy-water plant.

In one embodiment, the liquid component (waste water) obtained from each operating period is stored in layers in a container according to deuterium concentration. In addition, the liquid component of lowest deuterium concentration in the container is recycled to the plant while the obtained liquid component forms a layer of highest deuterium concentration during each successive operating period. In this embodiment, the last-obtained liquid component is stored in a second container of sufficient capacity for a preset time before the heavy water plant is set in operation.

Figure 2C:
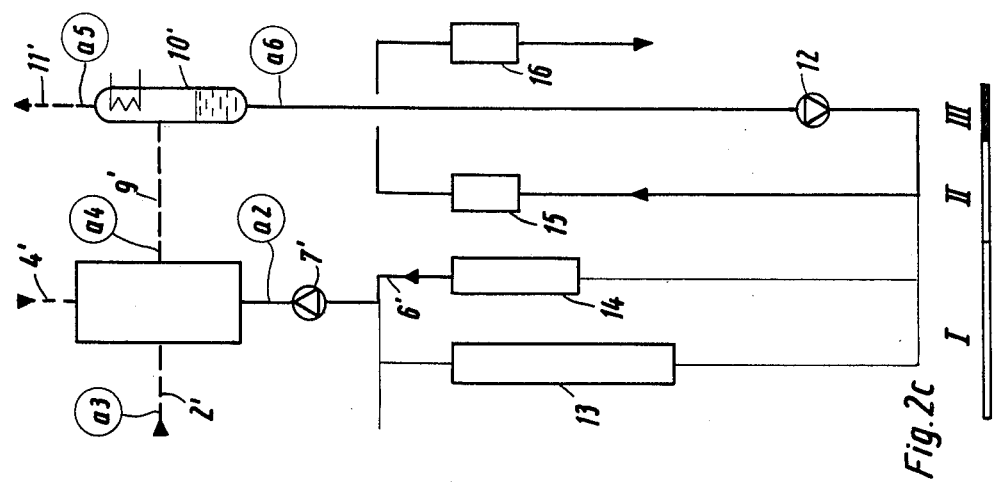
Figure 2B:
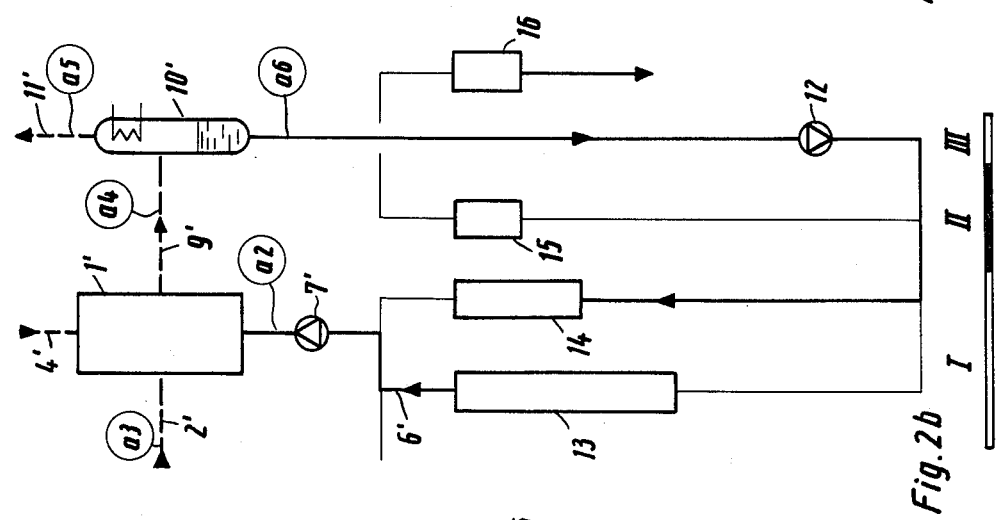
Figure 2A:
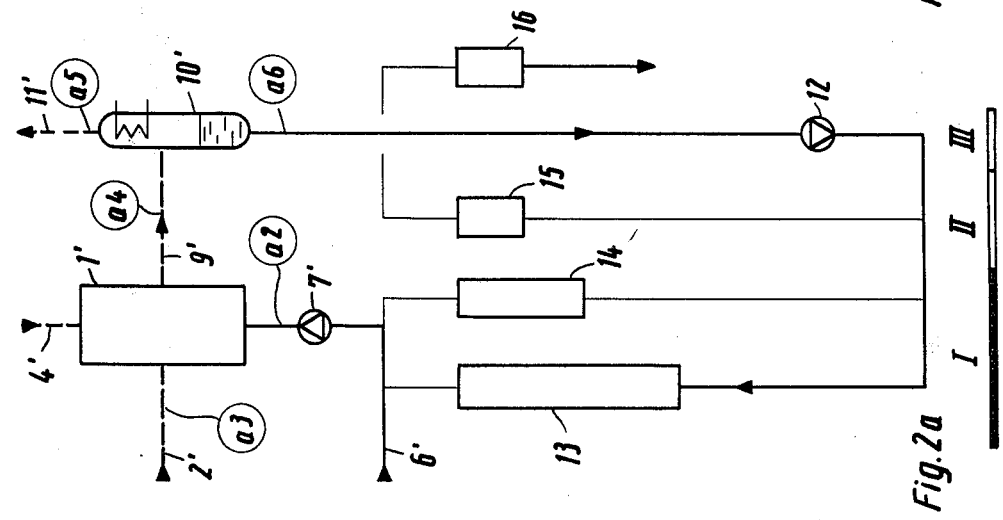
Figure 4:
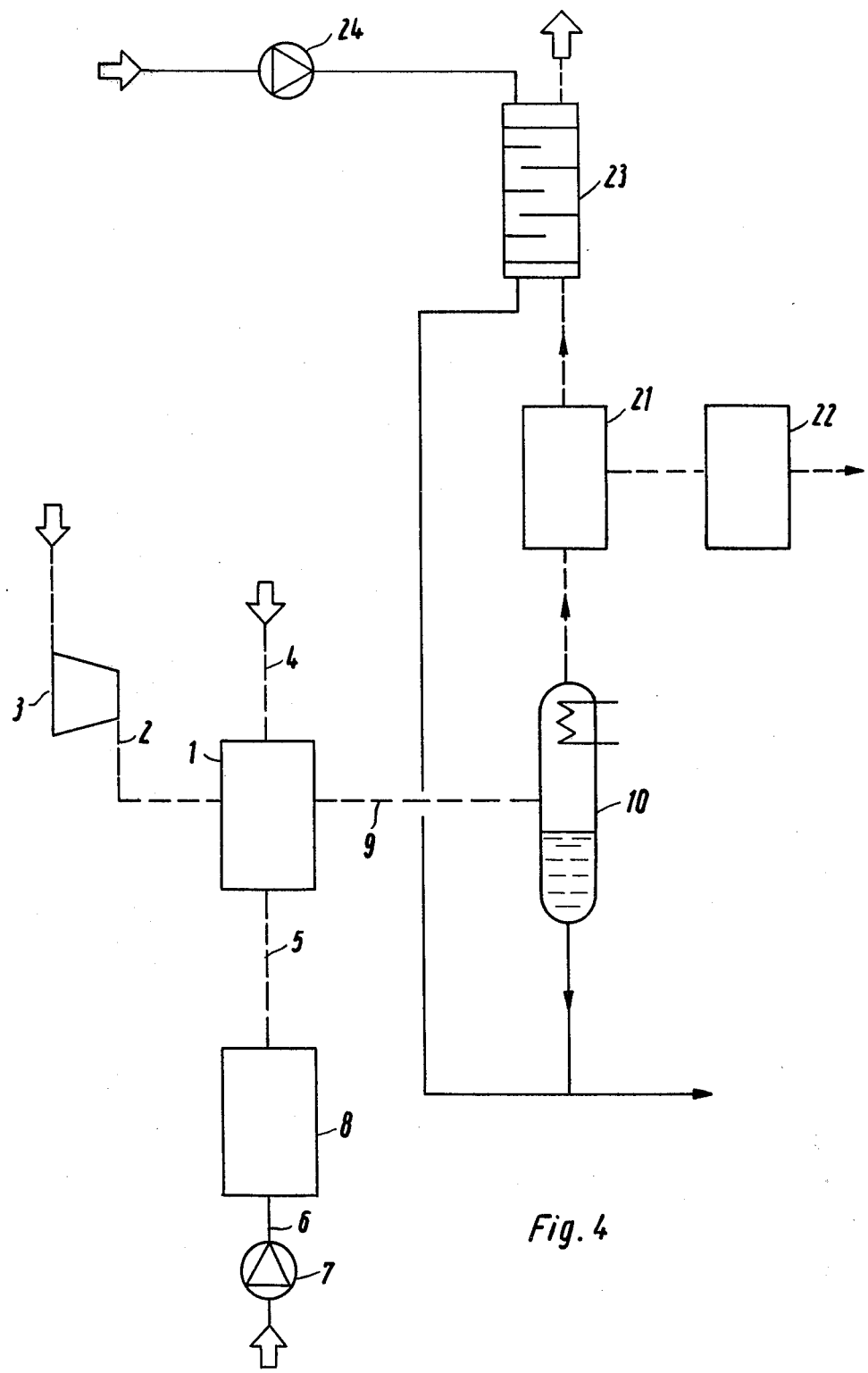
Figure 5:
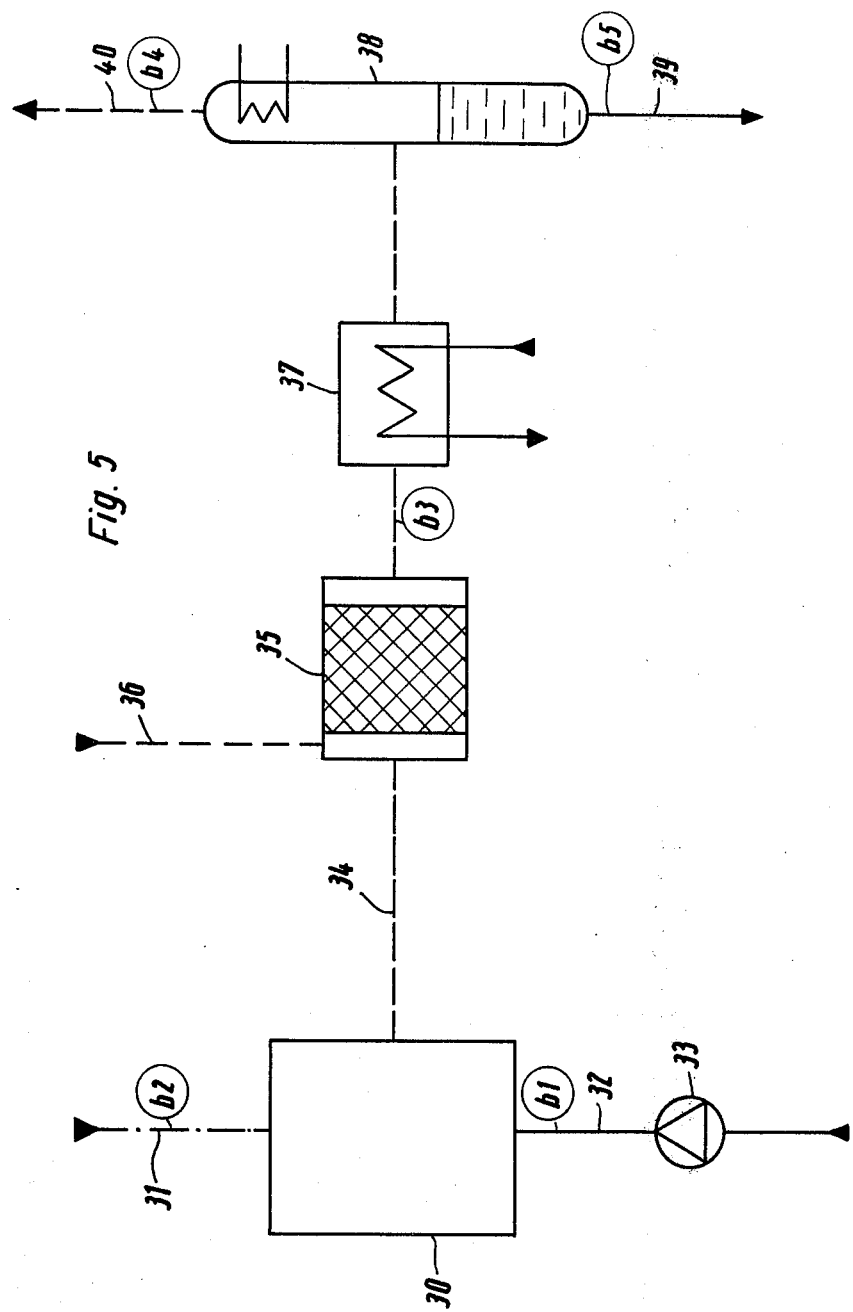

These and other objects and advantages of the invention will become more apparent from the following detailed description taken in conjunction with the accompanying drawings in which:

FIG. 1 diagrammatically illustrates a flow chart of a hydrogen-preparing plant having an output from which deuteriumenriched waste water is removed;

FIGS. 2a-2c each illustrate a flow diagram of a hydrogen plant comprising three separate storage containers and operating in three periods in accordance with the invention;

FIGS. 3a-3d each illustrate a flow chart of a hydrogen plant comprising a storage container and in which enriched waste water is stored in layers corresponding to deuterium concentration during various operating periods according to the invention;

FIG. 4 illustrates a portion of a variant of the plant in FIG. 1, for performing the process and recovering deuterium from the water-vapor in the synthesis-gas mixture, and FIG. 5 illustrates a flow chart of a hydrogen plant for obtaining hydrogen from water and carbon, e.g. coke.

Referring to FIG. 1, a known synthesis plant for the production of hydrogen has an output from which deuteriumenriched water is condensed and used as a feedstock for a heavywater plant. As indicated, the plant produces a mixture of sythesis gas comprising hydrogen and nitrogen which is used to prepare ammonia in a synthesis plant (not shown). Of course, the plant may be one in which hydrogen is to be prepared for another use, e.g. for producing methanol.

In FIG. 1 the plant is a catalytic, thermal plant 1 which is supplied through a line 2 with a hydrocarbon, such as methane, compressed to the operating temperature in a compressor 3, through a line 4 with air and through a line 5 with heated high-pressure steam (water vapor). The high-pressure steam is produced as follows. During a first operating period, fresh water is introduced into a steam generator 8 by a pump 7 through a line 6. The fresh water comes e.g. from a natural source, e.g. a river, lake or sea.

As is known, natural water has a deuterium concentration of about 130 to 160 ppm [D/(H+D)].

The plant 1 substantially comprises a primary reformer containing a catalyst, e.g. nickel oxide, which is supplied with the heated high-pressure steam and methane; a "secondary reformer" supplied with air, and a converter in which a chemical reaction occurs in accordance with the equation:

$$CO + H_2O \rightarrow CO_2 + H_2.$$

The effluent mixture leaving the plant 1 mainly comprises hydrogen, steam, carbon dioxide and nitrogen and is conveyed through a line 9 to a condenser 10 and separated into a liquid component and a gaseous component. The liquid component consists of deuterium-enriched waste water while the gaseous component consists mainly of hydrogen, nitrogen, carbon dioxide and traces of steam.

The gaseous component is then conveyed through a line 11 to an ammonia synthesis plant(not shown) after carbon dioxide and methane have been separated in known manner.

The deuterium-enriched waste water, the quantity of which is much smaller (for the previously-given reasons) than the amount of fresh water supplied to the plant 1, is taken from the condenser 10 and serves as the feedstock for a heavywater plant.

The following numerical example shows the deuterium concentrations and throughputs at points a1 to a6 of the process, and the separating factor $\alpha$.

| | THROUGHPUT IN kmol/h | | | | Deuterium concentration in ppm 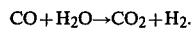 | | | | |
|---|---|---|---|---|---|---|---|---|---|
| | $H_2$ | $H_2O$ Vapor | $H_2O$ Liquid | $CH_4$ | $H_2$ | $H_2O$ Vapor | $H_2O$ Liquid | $CH_4$ | $\alpha$ $H_2O/H_2$ |
| a2 | — | 5039 | — | — | — | 146 | — | — | — |
| a3 | — | — | — | 2215 | — | — | — | 146 | — |
| a4 | 4136 | 257 | 2861 | — | 107 | 197 | — | — | 1.84 |
| a5 | 4136 | 257 | — | — | 107 | 197 | — | — | — |

-continued

| | Throughput in kmol/h | | | | Deuterium concentration in ppm $\left(\frac{D}{D+H}\right)$ | | | | |
|---|---|---|---|---|---|---|---|---|---|
| | $H_2$ | $H_2O$ Vapor | $H_2O$ Liquid | $CH_4$ | $H_2$ | $H_2O$ Vapor | $H_2O$ Liquid | $CH_4$ | $\alpha$ $H_2O/H_2$ |
| $a_6$ | — | — | 2861 | — | — | — | 197 | — | — |

FIGS. 2a to 2c are each a flow chart of a plant during three successive operating periods which, in the example, occur during a year (8,000 hours).

Compared with FIG. 1, FIGS. 2a to 2c have been simplified by omitting the steam generator 8 and the compressor for compressing methane, since they are not required for understanding the invention. The change-over valves are also omitted. Devices corresponding to FIG. 1 are given the same reference numbers plus a prime.

The pipe systems connected to the hydrogen plant 1' and condenser 10' comprise a pump 12, three storage containers 13, 14, 15 and a supply container 16.

Below each flow chart a time scale is given with the three operating periods I to III, the most recently-elapsed operating period being shown in thick lines.

The example also applies to a process for preparing hydrogen for producing ammonia.

During the first operating period I, the duration of which can be freely chosen (4232 hours in the subsequent numerical example), evaporated fresh water having the natural deuterium concentration is introduced through line 6' into the hydrogen plant 1', as described with reference to FIG. 1. As a result of the chemical reactions occurring in the plant 1', the amount of deuterium-enriched waste water separated in the condenser 10' is only half the amount of stored fresh water and is conveyed by the pump 12 to the storage container 13, which is dimensioned accordingly.

During the second operating period II, instead of fresh water, the waste water stored in the container 13 is discharged by the pump 7' into the plant 1', after being evaporated in a manner not shown. The throughput of all components in plant 1' remains the same during the entire operating time, since the plant 1' is always operating at full load during this time. Consequently, the operating period II is only half as long as period I.

After the waste water, further enriched in deuterium, has been separated from the effluent mixture in the condenser 10', the waste water is stored in the container 14, which is only half as large as container 13.

During the third operating period III, which is only half as long as a second period II, the waste water is introduced from container 14 into plant 1' and after being further enriched with deuterium during hydrogen preparation, is stored in a container 15, from which the waste water is introduced into a supply container 16 having the same size as the container 15.

During the entire operating period, enriched waste water from container 16 is supplied as a feedstock to a heavy-water plant (not shown). Delivery of the feedstock can be e.g. through lines or, if the heavy-water plant is more distant, by movable transport means such as trucks.

The additional supply container 16 ensures that the heavy-water plant can operate continuously, even during short stoppages of the hydrogen plant 1' as a result e.g. of power failures. The supply container will be dimensioned so as to ensure the desired uninterrupted operation of the heavy-water plant.

Of course, before the heavy-water plant is first put in operation, the supply container 16 must be filled with the required amount of enriched water, preferably by being filled from the hydrogen plant 1' for a suitable time before the heavy-water plant begins operation.

Alternatively, container 15 can be made large enough to do without the additional supply container 16.

The following is a numerical example of a process which can be performed in a plant having three operating periods.

| Operating Time | Hours of Operation | Reference Points | Throughput of hydrogen (kmol/h) | | | | Deuterium concentration in ppm (D/D + H) | | | |
|---|---|---|---|---|---|---|---|---|---|---|
| | | | $H_2$ | $H_2O$ Vapor | $H_2O$ Liquid | $CH_4$ | $H_2$ | $H_2O$ Vapor | $H_2O$ Liquid | $CH_4$ |
| I | 4232 | | | 5039 | | | | 146 | | |
| | (See FIG. 2a) | $a_2$ | — | — | — | — | — | — | — | — |
| | | $a_3$ | — | — | — | 2215 | — | — | — | 146 |
| | | $a_4$ | 4136 | 257 | 2861 | — | 107 | 197 | 197 | — |
| | | $a_5$ | 41360 | 257 | — | — | 107 | 197 | — | — |
| | | $a_6$ | — | — | 2861 | — | — | — | 197 | — |
| II | 2403 | | | 5039 | | | | 197 | | |
| | (See FIG. 2b) | $a_2$ | — | — | — | — | — | — | — | — |
| | | $a_3$ | — | — | — | 2215 | — | — | — | 146 |
| | | $a_4$ | 4136 | 257 | 2861 | — | 134 | 246 | 246 | — |
| | | $a_5$ | 4136 | 257 | — | — | 134 | 246 | — | — |
| | | $a_6$ | — | — | 2861 | — | — | — | 246 | — |
| III | 1365 | | | 5039 | | | | 246 | | |
| | (See FIG. 2c) | $a_2$ | — | — | — | — | — | — | — | — |
| | | $a_3$ | — | — | — | 2215 | — | — | — | 146 |
| | | $a_4$ | 4136 | 257 | 2861 | — | 158 | 291 | 291 | — |
| | | $a_5$ | 4136 | 257 | — | — | 158 | 291 | — | — |
| | | $a_6$ | — | — | 2861 | — | — | — | 291 | — |

| Operating Time | Hours of Operation | Storage Containers | Contents of Storage Containers (m³) | Deuterium Concentration in ppm $\left(\frac{D}{D+H}\right)$ in the Containers |
|---|---|---|---|---|
| I | 4232 | 13 | 217966 | 197 |
| II | 2403 | 14 | 123754 | 246 |
| III | 1365 | 15 | 70264 | 291 |

| | Hours | | Contents of | Deuterium Concentration in ppm | |
|---|---|---|---|---|---|
| Operating Time | of Operation | Storage Containers | Storage Containers (m³) | $\left(\dfrac{D}{D+H}\right)$ | in the Containers |
| TOTAL | 8000 | | 411984 | | |

The assumed output of feed water in the heavy-water plant is 0.75. In the present numerical example, this results in an annual heavy-water output of 17,034 kilograms (kg) per year.

The specific production of heavy water a, relative to the feed water, is:

$$2.42 \cdot 10^{-4} \text{ kg } D_2O/H_2O$$

As the preceding numerical example shows, the deuterium concentration of the waste water, supplied as the feedstock for a heavy-water plant, increases with the number of operating periods, whereas the throughput of waste water decreases. Depending on requirements, therefore, the process can be used either to obtain a greater throughput for the heavy-water plant with a lower concentration of deuterium or a smaller throughput with a correspondingly higher concentration of deuterium.

The following is a summary of numerical examples for 7 cases, clearly illustrating the aforementioned state of affairs. In all cases, the total operating time is 1 year, i.e. 8,000 hours.

In the first case, the total operating time is take up by a single operating period as in FIG. 1. In the second case, the operating time consists of two operating periods with two storage containers, the date being given for the second operating period. In the third case, the operating time consists of three operating periods, the data being given for the third operating period, and so on.

the amount of waste water produced during the first operating period I', and a second container 16'', from which the waste water most highly enriched with deuterium is supplied to a plant (not shown) for producing heavy water.

Storage container 20 must be constructed so that the deuterium-enriched waste water produced in the hydrogen plant 1'' and separated in the condenser 10'' can be stored in layers to prevent any mixing of the waste water stored during the individual operating periods. This can be achieved e.g. by suitable dimensions, e.g. great lengths and small diameter, or by baffle structures or other methods known from hot-water or cold-storage engineering.

FIGS. 3a to 3d show the plant under the following operating conditions:
FIG. 3a: Beginning of operating period I',
FIG. 3b: Beginning of operating period II',
FIG. 3c: Beginning of operating period III',
FIG. 3d: End of operating period III'.

Before the heavy-water plant is put into operation the supply container 16'', in a manner corresponding to that described with reference to FIGS. 2a to 2c, is filled with enriched water sufficient to provide the feedstock for producing heavy water for e.g. one year. Note that the deuterium concentration of the waste water in the container 16'' is always constant, as in container 16 in the second example.

In order to prevent the heavy-water plant from stopping if the hydrogen plant stops for a short period, e.g. as a result of a power failure, the supply container 16'' is advantageously over-dimensioned by the appropriate amount, as previously mentioned.

In the present example as before, a plant is used for producing hydrogen from methane and water for use as a component for a synthesis-gas mixture from which ammonia is obtained. Accordingly, the proportion of feed water to waste water is 2:1 as before, so that each operating period is half as long as the preceding period.

If this hydrogen in the hydrogen plant is from other hydrocarbons or used for another purpose, the propor-

| Operating Time | Number of Hours of Operation During The Last Operating Period | Annual Production of Enriched Water (kg/year) | Deuterium Concentration in ppm $\left(\dfrac{D}{D+H}\right)$ | Throughput at Inlet of Heavy-water Plant (kg/h) | Production of Heavy-Water (kg/year) | $a \cdot 10^{-4}$ $\left(kg \dfrac{D_2O}{H_2O}\right)$ |
|---|---|---|---|---|---|---|
| I | 8000 | 412 10⁶ | 197 | 51498 | 67761 | 1.649 |
| II | 2897 | 142.2 10⁶ | 246 | 18651 | 30538 | 2.046 |
| III | 1364 | 70.2 10⁶ | 291 | 8783 | 17034 | 2.421 |
| IV | 706 | 36.4 10⁶ | 335 | 4546 | 10138 | 2.787 |
| V | 381 | 19.7 10⁶ | 373 | 2458 | 6120 | 3.111 |
| VI | 211 | 10.9 10⁶ | 411 | 1359 | 3723 | 3.424 |
| VII | 118 | 6.1 10⁶ | 446 | 760 | 2261 | 3.718 |

FIGS. 3a to 3d show an embodiment in which the method is performed using only one storage container and a second container which is supplied with the waste water produced during the last operating period.

FIGS. 3a to 3d, like FIGS. 2a to 2c, are simplified by omitting the methane compressor 3 and the steam generator 8. The devices similar to those in FIGS. 1 or 2a to 2d are given the same reference numbers plus a double prime.

In the present example, unlike the example shown in FIGS. 2a to 2d, it is not necessary to use n storage containers for n operating periods but only a single storage container 20, which is given a volume to hold tion of waste water to feed water supplied to the plant at any one time will change in accordance with the equilibrium constants of the chemical reactions occurring during hydrogen production, with a corresponding change in the time factor of the individual operating periods.

The present description relates to three operating periods, the required annual throughput for the heavy-water plant being obtained at the end of the third period.

Of course, the plant could operate during a larger number of periods, subject to the purely practical limitation that when the number of operating periods increases, the deuterium concentration of the feedstock continuously increases but the amount thereof decreases.

During the first operating period I', fresh water having the natural deuterium concentration is supplied by a pump 7" through a line 6" into the plant 1" and is brought in contact with methane and air as in the first example. Waste water is separated from the resulting effluent mixture in a condenser 10" and is used to fill the storage container 20.

At the end of this operating period, the supply is switched over from fresh water to stored water (waste water from period I'). The storage container 20 remains connected to the condenser 10" (see FIG. 3b, which shows the beginning of operating periods II').

During the second operating period II', which directly follows the first operating period, in the present example half the waste water stored in container 20 is supplied to plant 1".

As in the first example, plant 1" must continuously operate at full load, and consequently the throughputs are constant during the entire operating time of e.g. 1 year (8,000 hours), so that the operating period II' is half as long as period I'.

If there are n operating periods (in the example n=3), the storage container 20 empties during the following (n−1) operating periods.

Layers of waste water form in the storage container 20 and have varying concentrations of deuterium and, during the process, move through the storage container and the hydrogen plant.

No switching-over in the pipe system, as in the system shown in FIGS. 2a to 2c, is required until the end of the $(n-1)^{th}$ operating period, i.e. period II' in the present case. From this time on, waste water from the condenser 10" is not stored in the container 20 but in the supply container 16" (compare FIGS. 3c and 3d). During the $n^{th}$ operating period also the hydrogen plant is supplied from the storage container 20, which is thus completely emptied.

The numerical example given for the embodiment in FIGS. 2a-2c applies to the present example if the throughputs are the same.

Since the water vapor does not completely condense in the condensers (10' or 10" in FIGS. 2a to 2c and FIGS. 3a to 3d), the mixture containing hydrogen gas or vapor and discharged from the condensers still contains a small amount of water-vapor. This water-vapor has the same deuterium concentration as the waste water separated in the condenser.

In the case of a process as described in the initially-mentioned U.S. Pat. No. 4,123,508, it has already been proposed to recover deuterium from the water vapor for use as a feedstock for a plant for producing heavy water.

Deuterium can be similarly recovered in the process according to the invention, as follows. Deuterium is transferred to fresh water by isotope exchange from the residual water vapor from the mixture obtained during the individual operating periods after the waste water has been condensed therefrom and the hydrogen has been separated, and the resulting enriched fresh water is added on each occasion to the waste water taken from the condenser.

Referring to FIG. 4 wherein like reference characters indicate like parts as above, this method is performed by supplying the mixture, consisting mainly of hydrogen, nitrogen, carbon dioxide and traces of water vapor, from the condenser 10 to a carbon-dioxide separator 21 of known construction (see e.g. Chemical Engineering Progress/Vo. 70/No. 2/February 1974, page 57, FIG. 4).

Next, the mixture is supplied to a conventional methanator 22 in which chemical reactions occur, as shown by the following equations:

$CO + 3H_2 \rightarrow CH_4 + H_2O$ and

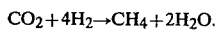

$CO_2 + 4H_2 \rightarrow CH_4 + 2H_2O$.

Fresh water having the natural deuterium concentration is supplied by a pump 24 from an additional water source into an exchange column 23, where the fresh water is brought into isotope exchange with deuterium-enriched water vapor taken from the carbon dioxide separator 21. During this step the fresh water becomes enriched with deuterium.

The water vapor from the exchange column 23, after being depleted in deuterium, is discharged from the plant together with carbon dioxide.

Enriched water is then conveyed to an extraction pipe of the condenser 10 and mixed with the waste water.

With reference to the embodiments shown in FIGS. 2a to 2c and 3a to 3d, the throughputs of waste water taken in condensor 10' or 10" are thus increased by the supplied throughputs of enriched fresh water in each operating period during the entire operating time. The only requirement is that correspondingly larger dimensions should be given to the storage containers 13-15 and 20 and supply containers 16 and 16".

The result, therefore, is a greater throughput of enriched water as the feedstock for the heavy-water plant. In this case, the feedstock has a somewhat lower deuterium concentration, since the deuterium concentration of the enriched fresh water is not as high as the deuterium concentration of the waste water taken from the condenser 10' or 10".

Referring to FIG. 5, the method may also be performed in a plant of different construction from the above described embodiments. For example, the hydrogen plant 30 is constructed as a water-gas generator supplied by a pipe 31 with carbon, advantageously coke, which is made incandescent in the plant 30, and with water by a pump 33 through a line 32.

The following reactions then occur in the water-gas generator 30 in known manner:

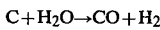

$C + H_2O \rightarrow CO + H_2$

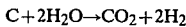

$C + 2H_2O \rightarrow CO_2 + 2H_2$

The effluent mixture is then supplied through a line 34 to a combustion device 35, and partly burnt in a supply of air delivered through a line 36, e.g. in the presence of a catalyst such as platinum.

The mixture is then cooled in a heat exchanger 37, thus recovering heat which is used e.g. for steam production. Waste water from the mixture is separated in a condenser 38 and removed through a line 39 from the plant and given further treatment, e.g. in a process as described with reference to FIGS. 2a to 2c or FIGS. 3a to 3d, before the waste water taken during the last operating period is supplied as a feedstock to a heavy-water plant.

The gaseous component of the mixture (carbon dioxide, hydrogen, nitrogen and residual water vapor) from the water separator 38 can then be discharged for further use.

If the aforementioned plant is used in conjunction with the process according to the invention, the ratio of feed water to waste water can be freely chosen due to the incomplete combustion, and a higher separating factor $\alpha$ of e.g. 2.03 at approximately 300° C. can also be achieved, due to the lower temperatures in the combustion device 35.

The following is a numerical example for an operating time of 8,000 hours (one year) and three operating periods.

| Operating Time | Number of Hours of operation during the last operating period | Reference Points | Throughput of hydrogen (kmol/h) | | | | Deuterium concentration in ppm (D/D + H) | | |
|---|---|---|---|---|---|---|---|---|---|
| | | | $H_2$ | $H_2O$ Vapor | $H_2O$ Liquid | C | $H_2$ | $H_2O$ Vapor | $H_2O$ Liquid |
| I | 4737 | $b_1$ | — | — | 33332 | — | — | — | 146 |
| | | $b_2$ | — | — | — | 8333 | — | — | — |
| | | $b_3$ | 16666 | 16666 | — | — | 97 | 196 | — |
| | | $b_4$ | 16666 | 1036 | — | — | 97 | 196 | — |
| | | $b_5$ | — | — | 15630 | — | — | — | 196 |
| II | 2221 | $b_1$ | — | — | 33332 | — | — | — | 196 |
| | | $b_2$ | — | — | — | 8333 | — | — | — |
| | | $b_3$ | 16666 | 16666 | — | — | 129 | 262 | — |
| | | $b_4$ | 16666 | 1036 | — | — | 129 | 262 | — |
| | | $b_5$ | — | — | 15630 | — | — | — | 262 |
| III | 1042 | $b_1$ | — | — | 33332 | — | — | — | 262 |
| | | $b_2$ | — | — | — | 8333 | — | — | — |
| | | $b_3$ | 16666 | 16666 | — | — | 173 | 350 | — |
| | | $b_4$ | 16666 | 1036 | — | — | 173 | 350 | — |
| | | $b_5$ | — | — | 15630 | — | — | — | 350 |

| Operating Periods | Hours of Operation | Contents of Storage Container (m³) | | | Deuterium concentration in ppm (D/D + H) in the Storage Containers |
|---|---|---|---|---|---|
| I | 4737 | 1 | 332 | 707 | 196 |
| II | 2221 | | 624 | 856 | 262 |
| III | 1042 | | 293 | 156 | 350 |
| TOTAL | 8000 | 2 | 250 | 179 | |

This Table is analogous with the Table which appears hereinbefore.

| Operating Time | Number of Hours of Operation in the last operating period | Annual Production of enriched Water (kg per year) | Deuterium Concentration in ppm (D/D + H) | Throughput at inlet of heavy water plant (kg/h) | | Production of Heavy water (Kg per year) | $a \cdot 10^{-4}$ $\left( kg \frac{D_2O}{H_2O} \right)$ |
|---|---|---|---|---|---|---|---|
| I | 8000 | 2251 · 10⁶ | 196 | 281 | 350 | 366675 | 1.629 |
| II | 2554 | 718 · 10⁶ | 262 | 89 | 816 | 156742 | 2.181 |
| III | 1042 | 293 · 10⁶ | 350 | 36 | 634 | 85607 | 2.921 |
| IV | 460 | 129 · 10⁶ | 469 | 16 | 191 | 50662 | 3.911 |
| V | 210 | 59 · 10⁶ | 628 | 7 | 393 | 30976 | 5.237 |
| VI | 97 | 27 · 10⁶ | 842 | 3 | 425 | 19214 | 7.013 |
| VII | 46 | 13 · 10⁶ | 1127 | 1 | 616 | 12143 | 3.390 |

What is claimed is:

1. A method for the preparation of deuterium-enriched water, said method comprising the steps of
supplying a carbonaceous feedstock selected from the group consisting of carbon and at least one hydrocarbon, and at least one of water and steam in excess to a hydrogen production plant for obtaining synthesis gas, operating the plant during at least two operating periods;

separating an effluent from the plant into a gaseous component and a liquid component consisting of deuterium-enriched water during each operating period;

isolating the deuterium-enriched water during each operating period;

thereafter introducing the deuterium-enriched water into the plant during the next operating period of shorter duration;

contacting the deuterium-enriched water in the plant during said next period with carbonaceous feedstock;

repeating this procedure during all subsequent periods except the last one;

separating an effluent from the plant during the last period into a liquid component consisting of a deuterium-enriched water and a gaseous component; and supplying the liquid component obtained during said last period to a plant for production of heavy water.

2. A method as set forth in claim 1 which further comprises the steps of storing the liquid component obtained during any said period except the last one in a first single container and storing the liquid component obtained during said last period in a second container for delivery to the plant for production of heavy water.

3. A method as set forth in claim 2 wherein the liquid component in the second container is stored for a preset time prior to delivery to the heavy water plant.

4. A method as set forth in claim 1 wherein the liquid component obtained during any said period is introduced into the plant during the next period at a rate equal to the rate of supply of water to the plant during said period.

5. A method as set forth in claim 1 wherein the liquid component from said second period is stored for a given time in a storage tank prior to supply to a plant for production of heavy water.

6. A method as set forth in claim 1 wherein the liquid component separated during each said operating period is less than the amount of the liquid component obtained during a previous period to an extent corresponding to the amount of hydrogen removed during said operating period.

7. A method as set forth in claim 1 which further comprises the steps of subjecting the gaseous component obtained during each operating period to an isotope exchange with fresh water after removal of hydrogen therefrom to transfer deuterium to the fresh water, and adding the deuterium enriched fresh water to the liquid component during each operating period.

8. A method for the preparation of deuterium-enriched water, said method comprising the steps of
supplying a carbonaceous feedstock selected from the group consisting of carbon and at least one hydrocarbon; and at least one of water and steam in excess to a hydrogen production plant for obtaining synthesis gas during a first operating period;
separating an effluent from the plant into a gaseous component and a liquid component consisting of a deuterium-enriched water during said operating period;
isolating the liquid component during said operating period;
thereafter introducing the deuterium-enriched water into the plant during a second operating period of shorter duration;
contacting the deuterium-enriched water in the plant during said second period with carbonaceous feedstock;
separating an effluent from the plant during said second period into a liquid component consisting of deuterium-enriched water and a gaseous component; and
thereafter repeatedly introducing the obtained deuterium-enriched water from each operating period into the plant in successive opeating periods to obtain successive deuterium-enriched water of increasing deuterium content; and
supplying the liquid component obtained during the last of the operating periods to a heavy water plant.

9. A method as set forth in claim 8 which further comprises the steps of storing the liquid component obtained during each successive operating period in layers in a first single container according to the deuterium concentration thereof and recycling the liquid component in the container of lowest deuterium concentration to the plant while delivering the obtained liquid component to the container to form a layer of highest deuterium concentration during each successive operating period, said first container having means to prevent mixing of water layers of different deuterium concentrations whilst said liquid component is fed into one end of said first container and is taken from the other end for feeding the hydrogen production plant.

10. A method for the preparation of deuterium-enriched water, said method comprising the steps of
supplying water in excess and carbon to a hydrogen production plant for obtaining synthesis gas, and operating the plant during at least two operating periods;
separating an effluent from the plant into a gaseous component and a liquid component consisting of deuterium-enriched water during each operating period;
isolating the deuterium-enriched water during each operating period;
thereafter introducing the deuterium-enriched water into the plant during the next operating period of shorter duration;
contacting the deuterium-enriched water in the plant during said next period with carbon;
repeating this procedure during all subsequent periods except the last one;
separating an effluent from the plant during the last period into a liquid component consisting of deuterium-enriched water and a gaseous and a liquid component component; and
supplying the liquid component obtained during said last period to a plant for production of heavy water.

11. A method for the preparation of deuterium-enriched water, said method comprising the steps of
supplying one of water and steam in excess and carbon to a hydrogen production plant for obtaining synthesis gas during a first operating period;
separating an effluent from the plant into a gaseous component and a liquid component consisting of deuterium-enriched water during said operating period;
isolating the deuterium-enriched water during said operating period;
thereafter introducing the deuterium-enriched water into the plant during a second operating period of shorter duration;
contacting the deuterium-enriched water in the plant during said second period with carbon;
separating an effluent from the plant during said second period into a liquid component consisting of deuterium-enriched water and a gaseous component; and
thereafter repeatedly introducing the obtained deuterium-enriched water from each operating period into the plant in successive operating periods to obtain successive liquid components of increasing deuterium content; and
supplying the liquid component obtained during the last of the operating periods to a heavy water plant.

12. A method for the preparation of deuterium-enriched water, said method comprising the steps of
supplying one of water and steam in excess and at least one hydrocarbon to a hydrogen production plant for obtaining synthesis gas, and operating the plant during at least two operating periods;
separating an effluent from the plant into a gaseous component and a liquid component consisting of deuterium-enriched water during each operating period;
isolating the liquid component during each operating period;

thereafter introducing the deuterium-enriched water into the plant during the next operating period of shorter duration;

contacting the deuterium enriched water in the plant during said next period with at least one hydrocarbon;

repeating this procedure during all subsequent periods except the last one;

separating an effluent from the plant during the last period into a liquid component consisting of deuterium-enriched water and a gaseous component; and supplying the deuterium-enriched water obtained during said last period to a plant for production of heavy water.

13. A method for the preparation of deuterium-enriched water, said method comprising the steps of supplying one of steam and water in excess and at least one hydrocarbon to a hydrogen production plant for obtaining synthesis gas during a first operating period;

separating an effluent from the plant into a gaseous component and a liquid component consisting of deuterium-enriched water during said operating period;

isolating the deuterium-enriched water during said operating period;

thereafter introducing the deuterium-enriched water into the plant during a second operating period of shorter duration;

contacting the deuterium-enriched water in the plant during said second period with at least one hydrocarbon;

separating an effluent from the plant during said second period into a liquid component consisting of deuterium-enriched water and a gaseous component; and thereafter repeatedly introducing the obtained deuterium-enriched water from each operating period into the plant in successive operating periods to obtain successive deuterium-enriched water of increasing deuterium content; and supplying the liquid component obtained during the last of the operating periods to a heavy water plant.

* * * * *

UNITED STATES PATENT AND TRADEMARK OFFICE
CERTIFICATE OF CORRECTION

PATENT NO. : 4,426,370
DATED : January 17, 1984
INVENTOR(S) : CHARLES MANDRIN

It is certified that error appears in the above—identified patent and that said Letters Patent is hereby corrected as shown below:

Column 3, line 8, change "that" to --the--

Column 3, line 59, change "deuteriumenriched" to --deuterium-enriched--

Chart, Column 11, line 44, change "179" to --719--

Column 12, line 61, chart, change "3.390" to --9.390--

Signed and Sealed this

Fifteenth Day of May 1984

[SEAL]

Attest:

GERALD J. MOSSINGHOFF

Attesting Officer     Commissioner of Patents and Trademarks